Feb. 2, 1937. S. D. BUTTERWORTH 2,069,644
CAR LOADING DEVICE
Filed Aug. 14, 1931 3 Sheets-Sheet 2

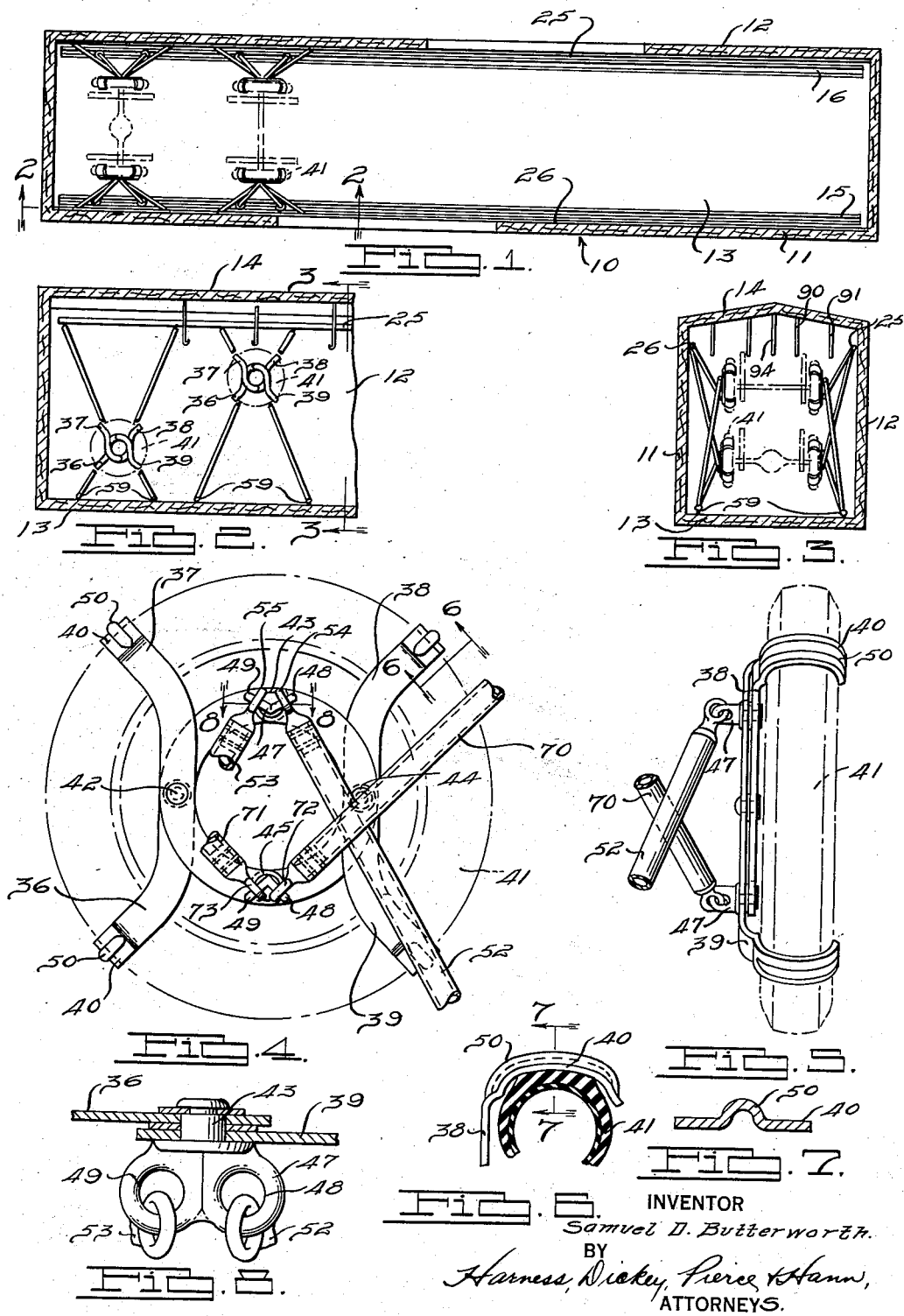

INVENTOR
Samuel D. Butterworth.
BY
Harness, Dickey, Pierce & Hann,
ATTORNEYS.

Feb. 2, 1937.  S. D. BUTTERWORTH  2,069,644
CAR LOADING DEVICE
Filed Aug. 14, 1931   3 Sheets-Sheet 3
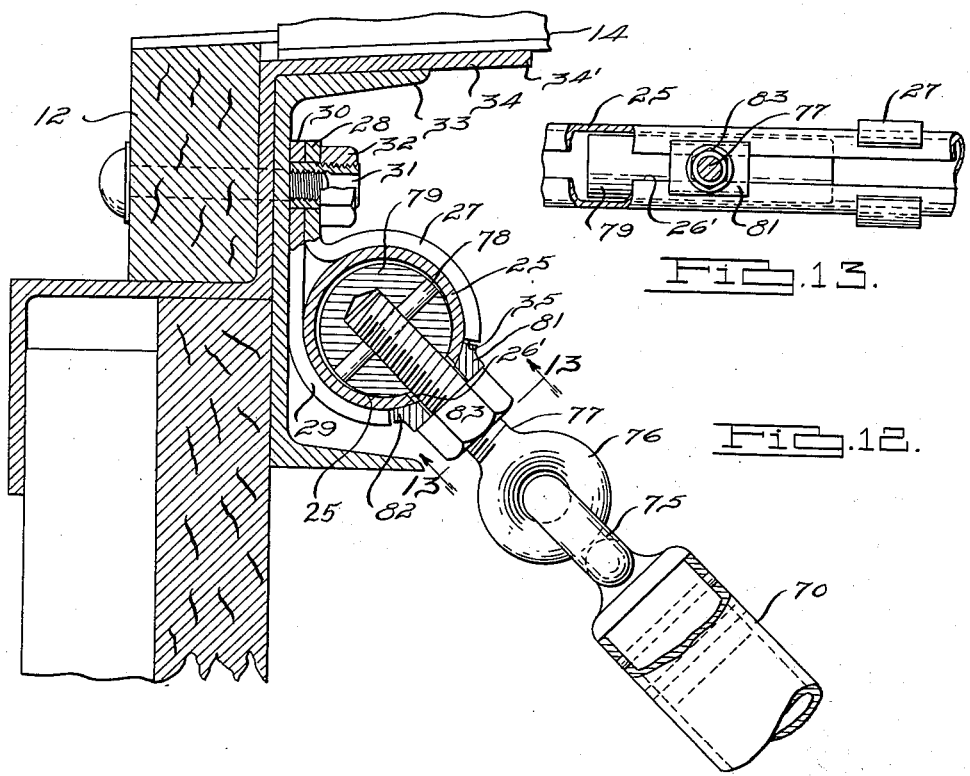
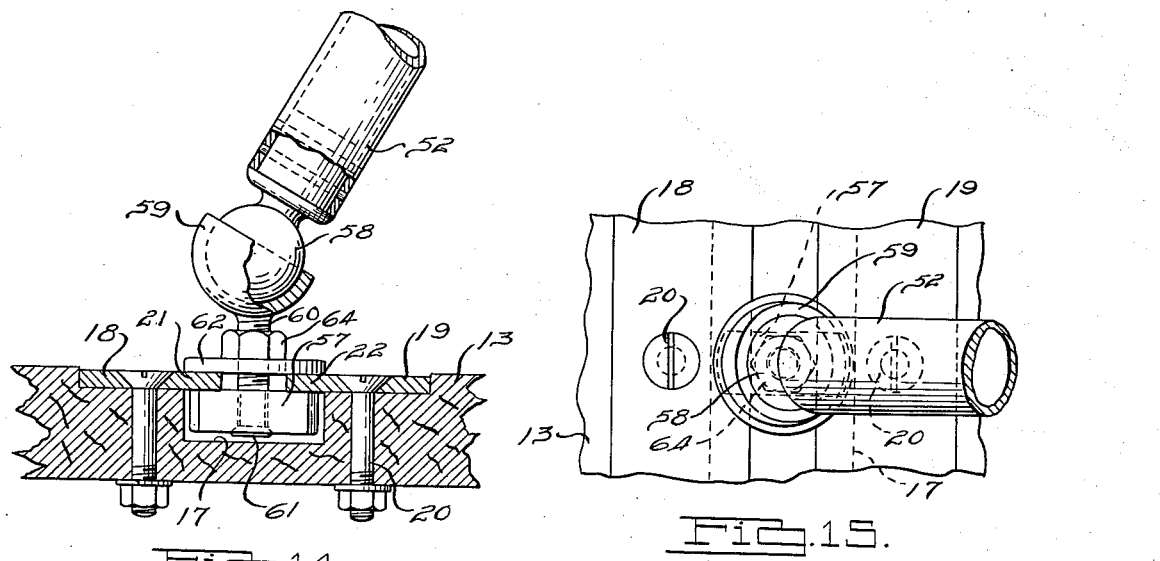
INVENTOR
Samuel D. Butterworth
BY
Harness, Dickey, Pierce & Hann
ATTORNEYS.

Patented Feb. 2, 1937

2,069,644

UNITED STATES PATENT OFFICE 2,069,644

CAR LOADING DEVICE

Samuel D. Butterworth, Detroit, Mich., assignor, by mesne assignments, of ninety-nine per cent to The Worth Company, a corporation of Michigan Application August 14, 1931, Serial No. 557,055

16 Claims. (Cl. 105—368)

The invention relates to loading devices and it has particular relation to devices for securing motor vehicles in freight cars, for transportation purposes.

The principal objects of the invention are to provide loading devices for securing motor vehicles in a freight car by means of which the vehicles may be disposed in inclined planes, thereby enabling the mounting of a larger number of vehicles in a given size of freight car; to provide a novel means for supporting an end of the vehicle above the floor of the freight car and in a plane different from that in which the other end of the vehicle is disposed; to provide devices of this character which include tire embracing lazy tongs engaging the tires at circumferentially spaced points and wherein the lazy tong arrangement is operated by the vehicular load for causing it to engage the tire firmly; to provide a device for suspending a motor vehicle in a freight car with the ends of the vehicle in different planes, which is adjustable to accommodate different sizes of vehicles; and to provide car loading devices which in their normal operative positions maintain a vehicle in an inclined plane, but which in their inoperative positions are disposed in out-of-the-way locations permitting use of the freight car for other purposes.

For a better understanding of the invention, reference may be had to the accompanying drawings forming a part of the specification wherein:

Fig. 1 is a longitudinal cross-sectional view of a freight car having loading devices therein constructed according to one form of the invention;

Fig. 2 is a cross-sectional view taken substantially along line 2—2 of Fig. 1;

Fig. 3 is a cross-sectional view taken substantially along line 3—3 of Fig. 2;

Fig. 4 is an enlarged side view of one of the tire embracing and supporting devices shown in Fig. 2;

Fig. 5 is an end elevational view of the construction shown by Fig. 4;

Fig. 6 is a cross-sectional view taken substantially along line 6—6 of Fig. 4;

Fig. 7 is a cross-sectional view taken substantially along line 7—7 of Fig. 6;

Fig. 8 is a cross-sectional view, on a larger scale taken substantially along line 8—8 of Fig. 4;

Fig. 12 is a cross-sectional view, on a larger scale taken substantially along line 12—12 of Fig. 9;

Fig. 13 is a cross-sectional view, on a smaller scale, taken substantially along line 13—13 of Fig. 12;

Fig. 14 is a fragmentary cross-sectional view of the floor of the freight car illustrating the manner of adjustably anchoring the vehicle supporting members on the floor; and Fig. 15 is a plan view of the construction shown by Fig. 14.

Figure 9:
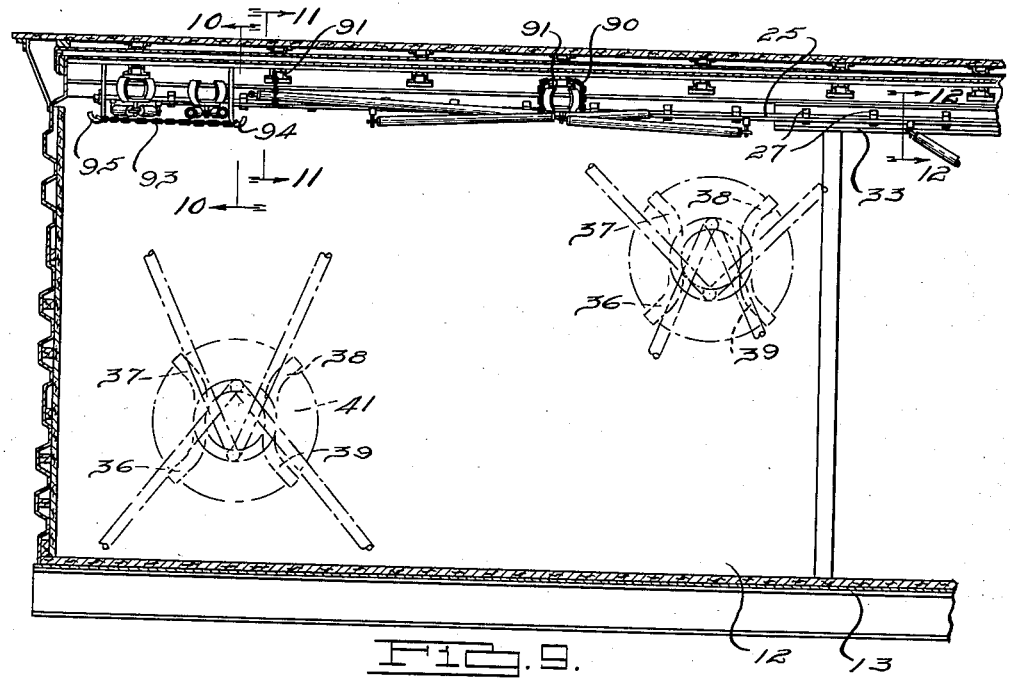
Fig. 9 is a fragmentary cross-sectional view similar to that shown by Fig. 2, illustrating the manner in which the loading devices are disposed in out-of-the-way positions when not in use.

Referring to Figs. 1 and 2, a freight car is indicated generally at 10 and comprises side walls 11 and 12, a floor 13 and a roof 14. The floor 13 adjacent each of the walls 12 and 13 is provided with grooves 15 and 16 and each of these grooves as best shown by Fig. 14, comprises a channel shape recess 17 extending longitudinally of the floor. At opposite sides of the recess 17 metal straps 18 and 19 are secured in substantially complementary recesses in the upper surface of the floor, by means of bolts 20. The straps 18 and 19 project partially over the recess 17 as indicated at 21 and 22 thereby providing a groove of undercut character.

Figure 10:
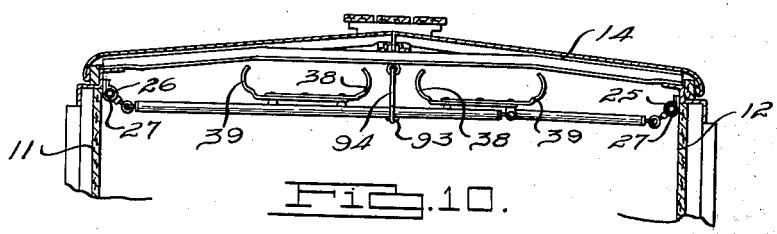
Fig. 10 is a cross-sectional view taken substantially along line 10—10 of Fig. 9.
Figure 11:
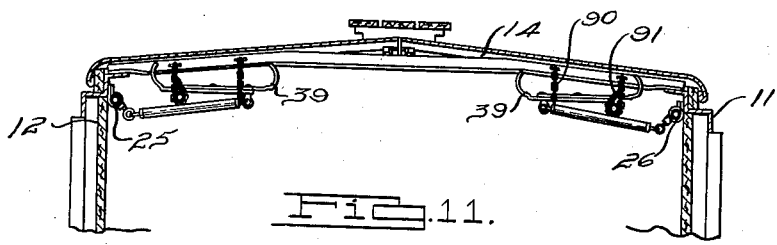
Fig. 11 is a cross-sectional view taken substantially along line 11—11 of Fig. 9.

As best shown by Figs. 10 and 11, the walls 12 and 13 at their upper edges are provided with a tubular guideway 25 and 26, each of which has a longitudinally extending slot 26'. Each of the tubular guideways as best shown by Fig. 12, is supported by an arcuate metal strap 27 having an offset portion 28, and a second arcuate metal strap 29 having an offset portion 30 cooperating with the offset portion 28. The offset portions 28 and 29 are secured by means of bolts 31 and nuts 32 to the wall of the car and such bolts constitute a part of the standard car construction, thereby avoiding the use of additional bolts. The view shown by Fig. 12 is taken above a door opening in the freight car, and at this particular point, the side walls are provided with channel irons 33 in addition to angular reinforcing irons 34' extending longitudinally of the car. At other places in the car construction, such as shown by the cross sectional views in Figs. 10 and 11, the channel irons 33 are not employed. The arcuate portions 27 and 29 embrace the tubular guideways but have their inner edges respectively located on opposite sides of the slot 26' in the guideway as indicated at 35.

Now as best shown by Figs. 4, 5 and 8, each tire of a motor vehicle is supported in the car, by a lazy tong arrangement including links 36, 37, 38 and 39, each of which has an offset portion 40 adapted to engage the periphery of the tire indicated at 41. The links are pivotally connected as indicated at 42, 43, 44 and 45 and each of the links inwardly of the pivot is of such arcuate shape, that when the links embrace the tire, the inner arcuate end portions thereof, define substantially a circle which is spaced considerably from the center of the tire. This arrangement is desirable because it leaves a large central opening at the center of the lazy tong for clearing the hub cap of the vehicle wheel and hence operation of the lazy tong without marring or scratching the hub cap or any part of the wheel at the center thereof. It will be understood from inspecting Fig. 4, that if the pivot points 43 and 45 are moved toward each other the tire engaging portions 40 on the links will be moved away from the periphery of the tire and in this manner the lazy tong may be removed from and associated with the tire. As best shown by Fig. 8, each of the pivots 43 and 45 includes an offset portion 47 having eyes 48 and 49. The tire engaging portion 40 on each link as best shown by Fig. 6 has an outwardly pressed portion 50 for the purpose of reinforcing it and preventing bending which might otherwise occur.

Also referring to Fig. 4, each of the lazy tongs shown therein is maintained in midair by means of downward diverging thrust rods 52 and 53 having eyes at their upper ends indicated at 54 and 55, engaging the eyes 48 and 49 on pivot pin 43. It will be understood that when a load is supported on the lazy tongs these thrust rods will constantly urge pivot pin 43 upward and hence will tend to draw the tire engaging portions 40 on the links more tightly against the tire. The lower ends of the thrust rods 52 and 53 are anchored in one of the grooves in the floor of the freight car and as best shown by Fig. 14, means for so anchoring each of the rods comprises a block 57 disposed in the recess 17 and normally under the projecting portions 22 and 21 of the metal straps bordering the groove. This block is of elongated character as best shown by Fig. 15 and when aligned with the recess between the straps may be removed from the groove.

Each of the rods 52 and 53 has a ball 58 on its lower end seating in a semi-spherical socket 59 integral with a threaded rod portion 60 which projects downwardly between the straps 18 and 19 through the block 57 and terminates in an enlarged portion 61 to prevent removal from the block. The parts are anchored with respect to the groove and straps 18 and 19 by means of a washer 62 on the upper side of the straps that is maintained thereagainst by means of a nut 64 on the threaded rod 60, which, when tightened draws the block up against the under surfaces of the straps, and the collar 62 down against the upper surfaces of the straps. It will be understood that the block 57 may be moved longitudinally of the groove when the nut 64 is loosened and hence the socket 59 disposed in various positions longitudinally of the groove, and hence the lower ends of the rods 52 and 53 anchored at various points in the groove.

Other rods 70 and 71 provided with eyes 72 and 73 at their lower ends are connected by such eyes to the eyes 48 and 49 on the pivot pin 45 of the lazy tong. The rods 70 and 71 extend upwardly in diverging relation and as best shown by Fig. 12 terminate in eyes 75. Each of the eyes 75 engages the eye portion 76 of an eye bolt 77 which projects through the slot 26' in one of the tubular guides 25 and 26. Inwardly of the guideway the eye bolt is secured by means of a pin 78 to a cylindrical bar 79 which may be adjusted longitudinally within the guideway. Outwardly of the guideway, the eye bolt 77 is provided with a collar 81 having offset side portions 82 adapted to engage the adjacent edges of the guideway, the dimensions of the collar being such that it may be moved between adjacent edges of the straps 27 and 29. A nut 83 on the eye bolt outwardly of the collar, when tightened, clamps the guideway between the bar 79 and the collar, but when the nut 83 is loosened the eye bolt and bar 79 may be moved longitudinally in the guideway and then secured in a different position.

When the vehicle is supported in the freight car, the front tires thereof, for example, are positioned much higher than the rear tires and consequently, the rods 52 and 53 constituting thrust, load supporting members, are rather long. The rear tires are located nearest to the floor and in this event the thrust members are rather short. The front tire supporting devices may be used for supporting the rear tires by inverting them so that the long rods 52 and 53 constituting thrust rods for the front tires, will be uppermost and the shorter rods 70 and 71 will constitute the thrust members. Of course, it should be understood that in using the device for supporting the front tire, as a means for supporting a rear tire, the short rods will be provided with balls at their lower ends instead of eyes and conversely when the long rods are suspended from the tubular guideways at opposite sides of the car their upper ends will be provided with eyes instead of balls.

When the motor vehicle is supported in the freight car by such mechanism associated with each tire as particularly illustrated by Fig. 3 any side swaying of the vehicle will tend to cause the thrust rods to urge the pin 43 upwardly and hence to collapse the lazy tongs more firmly about the tires, and also any side swaying of this character will cause the upper suspending rods to move the pivot pins 45 downwardly also causing, or tending to cause greater contracting of the lazy tongs.

When the devices are not in use, the anchors are removed from the grooves in the floor and then the parts are moved to positions adjacent the roof and in out-of-the-way positions. The front tire supporting means are collapsed longitudinally of the car as best shown by Fig. 9, by moving the bars 79 in the guideways 25 and 26, and each of the front tire supporting means is then supported from the roof by means of chain elements 90 and 91 shown in Fig. 11. The rear tire supporting means are swung laterally and upwardly against the rear part of the roof and are maintained in side by side relation by means of a chain 93 connected at opposite ends to hooks 94 and 95 suspended from the roof. Hence all of the parts are disposed in the upper part of the car, adjacent the roof, and will not interfere with the ordinary use thereof.

Car loading devices such as those described and illustrated prevent undesirable movement of the vehicle during transportation thereof and eliminate undesirable side swaying. Moreover, the devices will not cause any marring or scratching of the vehicle because they engage only the tires and particularly the central parts of the wheel will not be marred or scratched because of the peculiar construction of the lazy tongs which operate around the hub cap thereon. Mounting the vehicles in the car in inclined planes, and particularly maintaining both ends of the vehicle above the floor enables transporting a greater number of vehicles in a given space because the vehicles can be inclined in such manner that one vehicle can be moved under the other in a more desirable manner. It is obvious that either the front tires or rear tires or both sets of tires can be maintained in variable elevated positions by changing the positions of the anchors in the grooves of the floor and changing the positions of the upper rods with respect to the guideways adjacent the upper edges of the walls. Devices of this character operate without difficulty and are extremely durable. In general they increase the efficiency of motor vehicle transportation in freight cars because they enable transporting a large number of vehicles in a car of given dimensions.

Although only one form of the invention has been illustrated and described in detail, it will be apparent to those skilled in the art that various modifications may be made without departing from the scope of the appended claims.

I claim:

1. The combination with a freight car or the like, of a lazy tong for engaging the periphery of a tire on a vehicle in the car, said lazy tong having an open center to accommodate the hub cap of the wheel on which the tire is mounted.

2. The combination with a freight car or the like, of a lazy tong for engaging the periphery of a tire on a vehicle in the car, and means for so anchoring the lazy tong that it tends to contract about the tire upon movement of the vehicle.

3. The combination with a freight car or the like, of lazy tongs at opposite sides of the car for engaging the tires of a vehicle, and thrust members anchored to a lower part of the car and so connected to the lazy tongs that movement of the vehicle tends to contract the latter about the tire.

4. The combination with a freight car or the like, of lazy tongs at opposite sides of the car for engaging the tires of a vehicle, and thrust members anchored to a lower part of the car and so connected to the lazy tongs that movement of the vehicle tends to contract the latter about the tire, said thrust members extending upwardly in converging relation.

5. In combination with a freight car or the like, of means for laterally engaging the peripheral surface of a tire on a vehicle wheel mounted in the car, said means comprising peripherally spaced arcuate elements substantially complementary to the laterally directed contour of the tire surface, take up means at the side of the tire for connecting such elements and holding them against the periphery of the tire, and means operatively connected to such elements for supporting the tire and wheel in the car, said supporting means comprising a rigid member pivotally connected to an upper part of the car and to such take up means, and swingable to a position adjacent the roof, when not in use.

6. The combination with a freight car or the like, of means for anchoring the wheels of one axle of a vehicle with respect to the car, rigid members pivotally connected to upper and opposite sides of the car and depending downwardly and inwardly in converging relation for supporting the other wheels of the vehicle in elevated position, means at the lower end of each member for embracing a tire on the wheel adjacent thereto, said means including peripherally spaced arcuate elements extending laterally over the periphery of the upper part of the tire, said members being swingable to positions adjacent the roof of the car, and means for holding them in such position when not in use.

7. The combination with a freight car or the like, of means for anchoring one axle of a vehicle in the car, means for supporting the other end of the vehicle in an elevated position relative to the first end, said means comprising rigid members pivotally connected to upper and opposite sides of the car for pivotal movement in planes laterally of the car, means on the lower ends of the members for engaging both upper and lower portions of the tires on the elevated axle so that the elevated end of the vehicle is supported and fixed against upward movement only by means engaging the tires, said members being swingable to positions adjacent the roof of the car when not in use, and means for holding them in said positions.

8. The combination with a freight car or the like, of means for anchoring one axle of a vehicle in the car, means for supporting the other end of the vehicle in an elevated position relative to the first end, said means comprising rigid members pivotally connected to upper and opposite sides of the car for pivotal movement in planes laterally of the car, means on the lower ends of the members for engaging only the tires of the elevated axle so that the elevated end of the vehicle is supported only by means engaging the tires, said members being swingable to positions adjacent the roof of the car when not in use, means for holding them in said positions, said tire engaging means including arcuate elements adapted to engage the tire at peripherally spaced points above and below the tire axis and corresponding generally to the contour of the tire in a lateral direction, and means for maintaining such elements against the tire surface under tension.

9. The combination with a freight car or the like, of means for anchoring one end of a vehicle therein, rigid members pivotally connected to upper and opposite sides of the car for holding the other end of the vehicle in relatively elevated position, means on the lower ends of the members for embracing only the tires of the elevated portion of the vehicle, said means including means for engaging laterally directed, peripherally spaced portions of the tire tread above and below the tire axis, means for maintaining the latter means under tension against the tire surface, said members being pivotal in planes laterally of the car and means for holding them in vertically swung positions adjacent the roof of the car when not in use.

10. The combination with a freight car or the like, of a lazy tong for clampingly engaging a tire of a vehicle and including parts collapsible radially against the outer periphery of the tire, and means positively connected to a wall of the car for anchoring the lazy tong in position.

11. The combination with a freight car or the like, of a lazy tong for clampingly engaging a tire of a vehicle and including parts collapsible radially against the outer periphery of the tire, said lazy tong having an open center to accommodate the hub cap of the wheel on which the tire is mounted, and means positively connected to a wall of the car for anchoring the lazy tong in position.

12. In combination with a freight car or the like, of depending means connected to an upper part of the car, means projecting upwardly from a lower part of the car, and means connecting said first and second means and also clampingly engaging the tire on a wheel of a vehicle at points on said tire above and below its axis and preventing movement of the wheel both longitudinally and vertically.

13. In combination with a freight car or the like, of depending means connected to an upper part of the car, means projecting upwardly from a lower part of the car, and means connecting said first and second means and also clampingly engaging the tire on a wheel of a vehicle at points on said tire above and below its axis and preventing movement of the wheel both longitudinally and vertically, said first means and second means comprising respectively, downwardly converging members and upwardly converging members.

14. In combination with a freight car or the like, of depending means connected to an upper part of the car, means projecting upwardly from a lower part of the car, and means connecting said first and second means and also clampingly engaging the tire on a wheel of a vehicle and preventing movement of the wheel both longitudinally and vertically, said last mentioned means comprising contractile elements adapted to be contracted into engagement with the tire by the weight of the vehicle supported.

15. In combination with a freight car or the like, of means connected to the car for supporting the wheel of a vehicle in elevated position, means connected to the first means for clampingly engaging the tire on the wheel at peripherally spaced points, and means automatically effecting clamping of the second means around the wheel when the vehicle load is supported thereby.

16. In combination, a freight car, a load supporting member connected to said freight car, a pair of rigid links lying in a substantially vertical plane extending longitudinally of the car and having fixed with respect thereto tire engaging lateral extensions at their lower ends and being pivoted at their upper ends to a load supporting member on an axis transverse to the car and adapted to diverge downwardly therefrom into engagement with peripherally spaced points on opposite sides of the lowermost point on the tire of an automobile wheel for supporting the latter, and means to prevent movement of said wheel upwardly relative to said pivotal axis.

SAMUEL D. BUTTERWORTH.